United States Patent [19]

Arora

[11] Patent Number: 4,718,023

[45] Date of Patent: Jan. 5, 1988

[54] ULTRASONIC APPARATUS FOR POSITIONING A ROBOT HAND

[75] Inventor: Arvind Arora, Moorpark, Calif.

[73] Assignee: Photo Acoustic Technology, Inc., Newbury Park, Calif.

[21] Appl. No.: 675,424

[22] Filed: Nov. 27, 1984

[51] Int. Cl.$^4$ ............................................. G06F 15/46
[52] U.S. Cl. ...................................... 364/513; 901/46; 73/625; 364/182
[58] Field of Search .................. 364/513, 182; 901/46, 901/47, 1; 73/625, 628, 641

[56] References Cited

U.S. PATENT DOCUMENTS

| | | | |
|---|---|---|---|
| 3,934,457 | 1/1976 | Clark et al. | 901/46 |
| 3,967,242 | 6/1976 | Isoo et al. | 364/513 |
| 4,166,543 | 9/1979 | Dahlstrom | 364/513 |
| 4,196,049 | 4/1980 | Burns et al. | 901/46 |
| 4,326,155 | 4/1982 | Griebeler | 901/46 |
| 4,370,889 | 2/1983 | Ruthrof et al. | 901/46 |
| 4,543,638 | 9/1985 | Scarffe | 364/182 |
| 4,575,304 | 3/1986 | Nakagawa et al. | 901/47 |
| 4,611,296 | 9/1986 | Niedermays | 364/513 |

OTHER PUBLICATIONS

"Computer-Controlled Robot with Ultrasonic Sensor", F. J. Affinto et al., IBM Bulletin, vol. 18, No. 8, 1/76, pp. 2665-2667.
"Ultrasonic Ranging System", Polaroid Corporation.

Primary Examiner—Jerry Smith
Assistant Examiner—John R. Lastova
Attorney, Agent, or Firm—Gregory O. Garmong

[57] ABSTRACT

A robot positioning apparatus for use with robot devices having a movable portion, wherein the movable portion may be spatially oriented to, and controllably spaced from, a reference surface. Initial locating of the reference surface is accomplished by an approximate positioning subsystem using multiple, angularly oriented units which send and receive acoustic orientation positioning signals in search of the reference surface. Once a return signal is received, switching logic identifies the necessary reorienting of the movable portion to achieve approximately the proper facing relationship of the movable portion to the surface. For precise positioning and ranging after the facing relation is established, a precision positioning subsystem emits an acoustic signal toward the surface, and a response signal is received back from the surface by at least two, and preferably three, receivers mounted upon the movable portion of the robot device. A comparator compares the times of flight of the signals received by the receivers on a pair-wise basis, thereby determining the relative distance of the pair of receivers from the surface, which in turn is a direct indication of the spatial orientation of the compared receivers in relation to the reference surface. The signal time of flight from the surface to the receivers is measured as an indicator of the distance of the receivers from the surface. The movable portion of the robot device is adjusted to maintain some predetermined distance and spatial orientation for the signal receivers mounted on the movable portion, thereby orienting the movable portion with respect to the surface in three dimensions.

1 Claim, 9 Drawing Figures

ULTRASONIC APPARATUS FOR POSITIONING A ROBOT HAND

BACKGROUND OF THE INVENTION

This invention relates generally to robot devices, and, more particularly, to apparatus for positioning a movable part of a robot in relation to a surface.

Robots are mechanical devices which can perform tasks in a manner that simulates human activity. One type of robot, the industrial robot, is finding widespread acceptance in manufacturing and other industrial operations, and promises many benefits in the automation of repetitive industrial operations. A typical industrial robot includes a stationary portion, usually referred to as the body, and a movable portion, usually referred to as the arm, wrist or hand, with the movable portion adapted for performing an operation on a workpiece. By way of example, robot arms can assemble components, join components as by welding, and finish components as by cleaning and painting.

In most industrial operations, a critical aspect of the operation of robot devices is the precise positioning of the movable robot arm with respect to the workpiece. In the simplest robots, each workpiece must be positioned at an exact location and orientation with respect to the robot arm, so that no separate sensing device is necessary to orient the robot arm with respect to each successive workpiece. For the robot arm to perform operations which require it to move over the surface of a workpiece, usually referred to as a continuous path operation, as in the painting of a part, a coordinate map of the surface of the workpiece must be coded into the memory of a computer which controls the trajectory of the moving robot. In such simple robots, failure to orient a workpiece in its exactly proper position can result in a failure of the operation to be performed by the robot. Further, such robots must be dedicated in the sense that a large amount of information concerning each particular type of workpiece must be coded into the control computer, and changes in the workpiece require reprogramming.

A more complex type of control utilizes some form of sensor to gather information about the workpiece and transmit this information to the robot, thereby providing a control input to the robot. As an example, a tactile or proximity sensor incorporated in the hand of the robot may be used to indicate the presence of a workpiece, and may also give some basic information about its orientation. Multiple tactile sensors can also be used to advantage. In a somewhat similar approach, light sources and photo cells may be used in combination to provide light beams which are broken when a workpiece is moved into position. However, both these approaches have not proved sufficiently versatile for use in many applications, especially where the robot arm is not in contact with, or in the close proximity of, the workpiece.

More recently, solid state video imaging systems have been developed for controlling robot devices. Such video imaging systems typically operate in a manner similar to television, wherein a visual field is scanned by a solid state camera to produce a sequential electronic signal having the visual image encoded thereupon. The digital signal is used to reconstruct an image on a television viewer or, for the purposes of controlling a robot, may be analyzed by existing pattern recognition techniques to provide information to the robot about the position, shape, and orientation of the workpiece, and the spacing of the robot arm from the workpiece. While robots having electronic video imaging systems represent an advance over the more primitive robots, such systems have severe disadvantages that limit their utilization in many applications. In many adverse working environments it is impossible to provide enough light to the camera. Image enhancement techniques are known, but in adverse environments the image may be insufficient for their use. More significantly, however, in all working environments such video imaging systems require a complex system utilizing extensive hardware components, including solid state cameras, a monitor and a computer, and complex programming and algorithms to recognize the patterns. The information from such video imaging systems is provided to a controlling computer which follows the encoded coordinate maps to guide the robot to take each successive step. Once the robot moves to its next step, the entire process of detecting the robot position and guiding it further must be repeated. In addition, the information transmission between interfaced devices is inherently slow, so that the system can communicate at a rate no greater than about 10–50 functions per second, thus limiting the speed and performance of the robot.

Robots equipped with video imaging systems must be controlled and their movement integrated by a central controller computer. This computer must necessarily be large and complex to provide the robot controller with a high degree of versatility, since it is often necessary to perform major computer reprogramming if the design of the workpiece is changed. For example, the computer may be programmed with a mathematical model of the surface of the workpiece for use in the pattern recognition function, and this mathematical model must be changed when the robot is to operate upon a different or modified workpiece. To some extent, such computers are therefore dedicated to use with a single type of workpiece, although the dedication may be changed by reprogramming.

There has been a need for a more versatile, non-dedicated apparatus to enable robots to sense the positioning of their movable arms with respect to the surface of a workpiece. Desirably, such an apparatus would be operable in adverse environments and would permit more rapid signal processing with less complex, less costly hardware and software. Such apparatus should be operable to allow the movable part of the robot to be positioned in a controllable manner adjacent the workpiece, with little or no preprogramming required for adapting the robot to operation in a continuous path on different workpieces. The present invention fulfills this need, and further provides related advantages.

SUMMARY OF THE INVENTION

The present invention resides in apparatus for sensing the presence and orientation of a surface, and then positioning a movable part of a robot, such as a robot arm, wrist, or hand, with respect to the surface, as on a workpiece to be processed by the robot. The apparatus utilizes parallel processing of signals to provide very high analysis cycle rates, typically on the order of 40,000–200,000 functions per second. The apparatus is operable in a wide range of liquid and gaseous environments, and its operation is largely unaffected by transient environments, such as those having vibrations, humidity or sparks, and environments having low or high light levels. The apparatus requires relatively simple hardware and no software to perform the basic positioning functions, so that the robot command and control functions may be separated, with the control function remotely positioned in the movable arm. The control circuitry may be significantly reduced and simplified, thereby reducing the cost and complexity of the robot and eliminating most programming costs, while at the same time greatly increasing its versatility for operating upon a wide variety of types of workpieces.

In accordance with the invention, the apparatus for positioning a movable portion of a robot device with respect to a surface includes a precision positioning subsystem, an approximate positioning subsystem, or, preferably, both subsystems. The precision positioning subsystem comprises means for emitting an emitted signal toward the surface; means for receiving a response signal originating at the surface as a result of the emitted signal striking the surface, the means for receiving being mounted on the movable portion of the robot device and including at least two signal receivers; means for comparing the time of flight of the signals received by the signal receivers on a pair-wise basis to create a comparison signal; and means for adjusting the movable portion of the robot device to maintain a predetermined value of the comparison signal on a pair-wise basis. The precision positioning sub-system may also include means for calculating the distance of the movable portion of the robot from the surface, from the time of flight of the signal received by at least one of the signal receivers, and means for comparing this calculated distance with a distance command signal so that the spacing of the movable portion of the robot may be adjusted to maintain the calculated distance equal to the distance command signal. Thus, the orientation of the movable part of the robot with respect to the surface may be determined and controlled through comparison of the time of flight of the signals received by the receivers, and the distance may be determined and controlled by the absolute value of the time of flight.

The approximate positioning subsystem comprises means for emitting at least two non-colinear emitted signals; means for receiving the respective response signals, if any, resulting from the striking of the respective emitted signals on a surface, said means for receiving being mounted on the moveable portion of the robot device; means for detecting the presence of a received signal; and means for adjusting the moveable portion of the robot device into an approximate facing relationship to the detected received signal. The approximate positioning subsystem is used to locate the surface and to approximately orient the precision positioning subsystem for precise robot control, but does not itself adjust the ranging of the moveable portion.

In a presently preferred embodiment, four pairs of emitting and receiving transducers of the approximate positioning subsystem are mounted peripherally on side lips of a sensor head and angularly directed outwardly and upwardly so as to sense the presence of a surface over a broad viewing area. The precision positioning subsystem transducers are mounted centrally among the approximate-positioning transmitters and receivers and have a relatively narrow field of view. The apparatus can thus seek out and locate a surface with the approximate positioning subsystem, rotating the moveable portion so that the precision positioning subsystem transducers approximately face the surface. Precise positioning and distance control are achieved by the precision positioning subsystem.

In this preferred embodiment the apparatus is responsive to one or more of four location incrementing command signals, three angular positioning command signals and one distance (range) positioning command signal. Mounted on the robot arm, the transmitters and receivers are arranged in a manner to provide a spatial field of view of about 135°–140°. The four pairs of wide beam transmitters and receivers of the approximate positioning subsystem view in four orthogonal directions within the field of view, while one narrow beam transmitter and three receivers of the precision positioning subsystem are mounted to view in the direction along the common axis of the four orthogonal directions. The electronic circuitry includes a signal generator to trigger the transmitters; a switching logic to provide the orientation control signal; two comparators, each of which receives the signal from one pair of the acoustic receivers and compares the signals to produce an output positioning control signal proportional to the difference in the time of flight of the signals received by each respective pair of acoustic receivers; a distance calculator which calculates a distance based on the time between emission of the acoustic signal and its receipt; and a controller for adjusting the position of the robot arm so that the two orientation command signals are respectively equal to the two orientation control signals, and the distance command signal is equal to the distance control signal.

The use of acoustic frequencies is preferred, since acoustic transmitters and receivers are readily available, and the signal propagation times are sufficiently rapid to allow high functional repetition rates, but sufficiently slow to allow the use of conventional comparators and time of flight measurement circuitry. The acoustic transmitters and receivers are preferably mounted on a square, flat sensor head having angled side lips at preferably 60° upward inclination on each of the four sides of the head, which in turn is mounted on the hand of the robot arm. One narrow beam acoustic transmitter is located centrally within the pattern formed by the three narrow beam acoustic receivers on the flat face of the sensor head, preferably spaced 120° apart on the square. One pair each of the broad band acoustic transmitter and receiver are mounted to the lip face such that the field of view is about 135°–140°. Orientation control is achieved when the switching logic identifies which pair of the broad beam acoustic receivers mounted on the side lips is receiving a response signal after reflection from an obliquely oriented reference surface in its field of view. The switching logic sends an orientation control signal to the robot motor controls and moves the robot hand in the direction from which the response signal was first received. The movement is continued until the response signal is no longer received by any of the side mounted broad beam acoustic receivers. At this time the robot hand is approximately in a facing relation with the flat face of the sensor head parallel to the reference surface. Precise position control is then achieved by measuring the difference between the time of flight of the acoustic signal to the different precision positioning subsystem acoustic receivers. For example, the sensor head is oriented parallel to the surface when the three time of flight signals are equal. Total distance from the surface of the workpiece to the robot hand is proportional to the time of flight of the acoustic signal. The controller drives positioning motors which can reorient the hand of the robot arm and also change its distance from the surface, thereby achieving complete positioning control of the arm in relation to the workpiece, without the need for a complex pattern recognition function or pre-mapping of the surface of the workpiece.

It will be appreciated from the foregoing that the present apparatus represents an important and significant advance in the field of controlling robot devices. The apparatus allows functional separation of the command and control operations so that the control function is accomplished remotely at the movable portion of the robot rather than requiring transmission of signals to a central command computer. Control is accomplished by parallel rather than serial processing to enable use of a high functional control rate, and the control function is achieved utilizing relatively simple hardware rather than a combination of complex hardware and complex software. Reprogramming costs are therefore significantly reduced as compared with prior devices. The apparatus is operable in a very wide range of operating environments without the need for readjustment or recalibration, including all light levels, dirty environments, and transient environments, such as clouds of opaque particles. Other features and advantages of the present invention will become apparent from the more detailed description, taken in conjunction with the accompanying drawings, which illustrate, by way of example, the principles of the invention.

DETAILED DESCRIPTION OF THE PREFERRED EMBODIMENT

Figure 1:
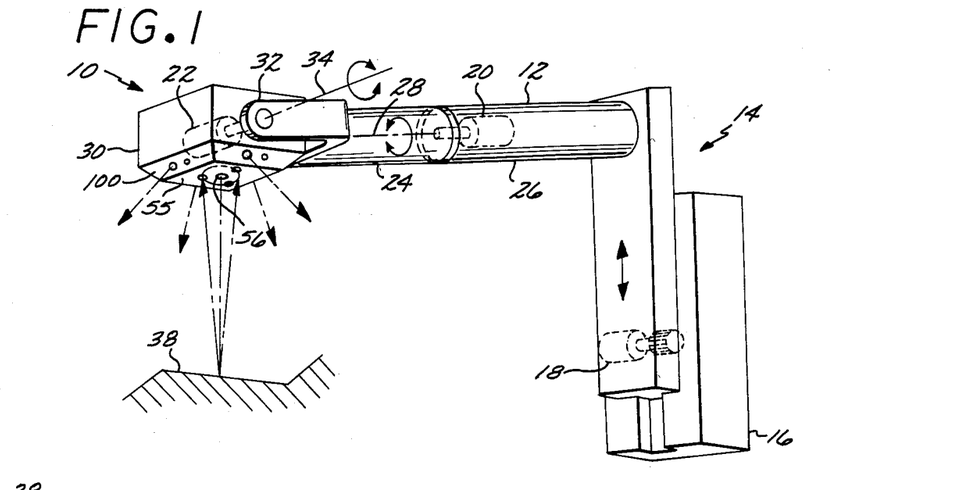
FIG. 1 is a perspective view of a robot arm employing an apparatus in accordance with a preferred embodiment of the invention, for orienting the arm with respect to a surface.

As is shown in the drawings with reference to a preferred embodiment, the present invention is concerned with apparatus 10 for controlling the movable portion or arm 12 of a robot device 14. The robot 14 comprises a stationary base 16 and the movable arm 12. Robots may have a variety of physical arrangements for attaining movement in three dimensions, and the robot 14 of FIG. 1 illustrates just one such possibility. In the robot 14, the movable arm 12 achieves vertical movement by a vertical movement motor 18. Rotational movement about two axes in a horizontal plane is accomplished by a first rotational motor 20 and a second rotational motor 22. The first rotational motor 20 causes rotation of an outer arm 24 in relation to an inner arm 26, about a first rotational axis 28. The second rotational motor 22 accomplishes rotation of a sensor head 30 in a yoke 32 of the other arm 24, about a second rotational axis 34 which is perpendicular to the first rotational axis 28. Complete three-dimensional movement of the sensor head 30 is accomplished by coordinated operation of the motors 18, 20, and 22.

Figure 2:
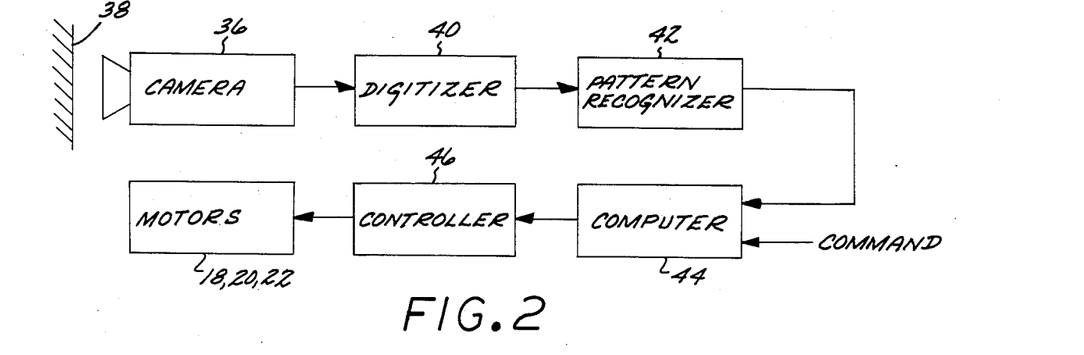
FIG. 2 is a block functional diagram of a prior approach to positioning of a robot arm using a video camera.
Figure 3:
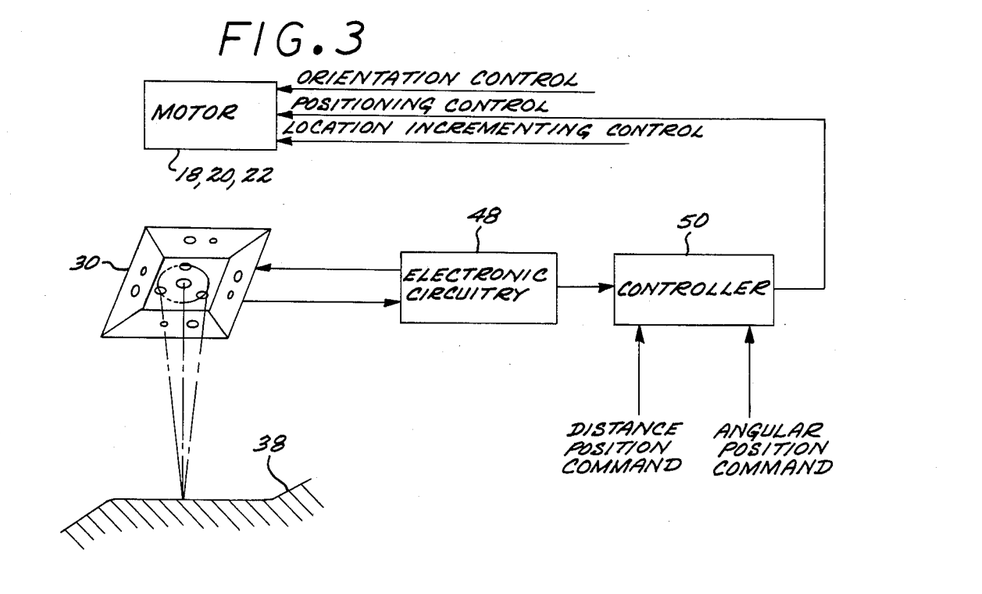
FIG. 3 is a block functional diagram of one embodiment of the present approach to orienting a robot arm.

The present invention relates to apparatus 10 for controlling the movement of the motors 18, 20, and 22. By way of contrasting the operation of the apparatus 10 with prior apparatus which also achieves control of the motors, FIGS. 2 and 3 present block functional diagrams of the prior approach and the present approach, respectively. As illustrated in FIG. 2, in the prior approach, a camera 36 is focussed on a surface 38 to create a scanned image of the surface 38. The scanned image is fed in a serial manner to a digitizer 40, whose output is presented to a pattern recognizer 42. The pattern recognizer 42 analyzes key features of the digitized serial representation of the image and compares it with a digital map provided in the memory of a computer 44 controlling the robot 14. An analysis of the position of the movable arm 12 with respect to the surface 38 is made by the computer 44, which compares the present position with a command signal. A repositioning signal is then provided to a controller 46 by the computer 44. The controller 46 generates a control signal which is provided to the motors 18, 20, and 22 which in turn drive the movable arm 12 to a relative position whereat the computer 44 recognizes the position relative to the surface 38 to be the same as that commanded. The speed of such recognition, as well as the overall system speed, is limited by the complex pattern recognition algorithms utilized in the pattern recognizer 42, and the electronic interfaces used for communication between the pattern recognizer 42, the computer 44, and the controller 46. Because of this complexity, the position of the movable arm 12 with respect to the surface 38 can typically be updated at a rate of only about 10–50 times per second. For many applications, this update rate for the adjustment of the position is far too slow.

The slowness and complexity of the prior approaches based on video scanning are believed to stem essentially from the fact that such approaches provide far more information and analysis than required for the operation and control of typical industrial robots by requiring complex pattern matching and analysis. In a typical situation, such detail is not required. Instead, it is desired to maintain the sensor head 30 of the robot 14 in a specified angular orientation with respect to the surface of a workpiece, and at a specified distance from the surface of the workpiece. For many operations, it is not necessary to obtain a complete analysis of the viewable portion of the workpiece, but rather it is necessary only to maintain the specified orientation and distance, and then to move to another location on the surface. That is, the control of orientation and distance is desirably accomplished automatically, independently, and separately, apart from the incremental movement of the sensor head 30 to another location. For example, in many applications it is desirable to retain the same relative orientation and distance of the sensor head 30 from the workpiece surface 38 at all relative positionings, as where the robot is operating to weld two workpieces together, or to paint, clean, spray or treat a curved workpiece surface. In such situations and in many others, it is far more efficient to place the relative angular and distance positioning function remotely in the movable arm 12, while providing a separate location incrementing command to the motors 18, 20 and 22, which increments the location of the robot arm with respect to the workpiece surface.

FIG. 3 illustrates the functional approach embodied in the present invention. The movement of the sensor head 30 in relation to a surface 38 is viewed as comprising three components, an orientation control component, a location incrementing control component and a positioning control component. The orientation component is the approximate relation of the sensor head 30 to the surface 38. It is determined by the approximate positioning subsystem in a manner to be described below in relation to FIG. 8. The positioning component includes the precise angular orientation of the sensor head 30 to the surface 38, and the precise vertical distance of the sensor head 30 from the surface 38. The location incrementing control component reflects the coordinate position of the sensor head 30 with respect to the surface 38, in the sense that the surface 38 may be viewed as having a set of coordinates defining each point or location on the surface 38. Its value is set externally in a manner to be described in relation to FIG. 8. As indicated, in many operations the positioning component remains constant or follows some simply defined pattern, as for example maintaining the sensor head 30 parallel to the surface 38 and at some fixed distance from the surface 38. The angular and distance commands are provided to a controller 50, which compares these commands to the actual relationship between the sensor head 30 and the surface 38, as determined by the electronic circuitry of the precision positioning subsystem. Utilizing the approach to be described, this comparison can proceed very rapidly and in a parallel processing manner, without the need for pattern recognition of the surface 38. Any deviation from a desired positioning command can be corrected with a positioning control signal provided to the motors 52, and originating in the precision positioning subsystem included in electronic circuitry 48. With the relative positioning of the sensor head 30 thus determined and controlled, the coordinate location may be directly controlled by providing a location control signal to the same motors 18, 20 and 22. It is not necessary to reevaluate location in order to maintain control of distance and angular position, nor need distance and angular position be considered explicitly when incrementing location.

In accordance with the invention, precision positioning of the sensor head with respect to the surface is accomplished by means of absolute and relative time of flight measurements for signals propagated from an emitter toward the surface 38, and return signals received from the surface 38 for at least two signal receivers located on the movable arm 12. The use of two signal receivers allows the determination of distance and relative orientation along a single axis, but the use of three receivers mounted in a non-colinear fashion is preferred, as this approach allows relative determination of angular orientations in two axes, and also the determination of distance. The following description is directed to the use of three receivers, although the principles are equally applicable to the use of two receivers, or more than three receivers.

Figure 4:
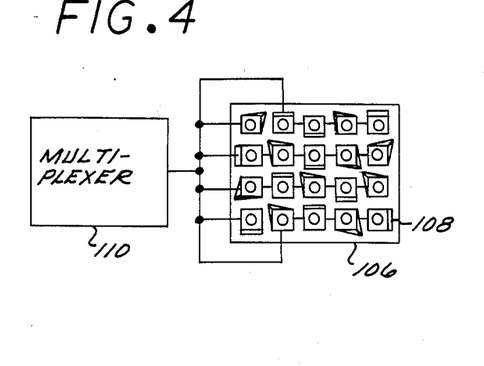
FIG. 4 is a perspective view of a multiple-sensor array used in approximate position control.
Figure 5:
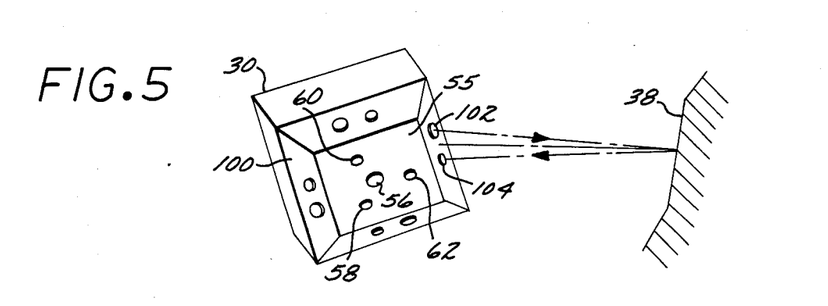
FIG. 5 is a perspective view of a presently preferred sensor head.
Figure 6:
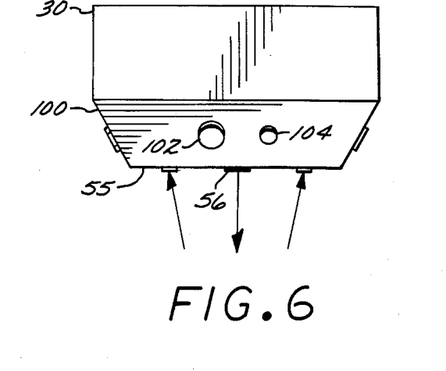
FIG. 6 is a side view of the sensor head of FIG. 5.

As illustrated in FIGS. 4-6, the apparatus 10 includes the sensor head 30 and associated electronic signal processing circuitry. The signal head 30 comprises a flat square mounting plate 55 having attached thereto a downwardly facing narrow beam transmitter 56 and three non-colinear narrow beam receivers, a first receiver 58, a second receiver 60, and a third receiver 62, which may be mounted in radial slots to allow radial adjustment. In the illustrated preferred embodiment, the receivers 58, 60, and 62 are located in a triangular arrangement, with the three receivers regularly spaced 120° apart from each other. The transmitter 56 is located generally in the center of the triangle formed by the three receivers 58, 60, and 62, so that the transmitter 56 is located at approximately the average height when the receivers 58, 60, and 62 are positioned at different heights from the surface of the workpiece.

Also in accordance with the invention, sensing of the approximate positioning of the sensor head 30 with respect to the surface 38 is accomplished by the use of four pairs of transmitters and receivers mounted on four lips 100 angularly attached to the mounting plate 55. As illustrated in FIGS. 5 and 6, each of the lips 100 is a rectangular flat plate rigidly joined to the mounting plate 55 at an upward and outward inclination, preferably oriented at about 60° from the plane of the mounting plate 55. One lip is so joined to each side of the square mounting plate 55. A broad beam transmitter 102 and a broad beam receiver 104 are attached flush to the surface of each lip 100. This arrangement provides a forward spherical field of view for the approximate positioning subsystem of about 135°–140° when the transducers 102 and the receivers 104 have a beam angle of about 25°.

Another preferred arrangement of the transducers and receivers in the approximate positioning subsystem is illustrated as a sensor array 106 in FIG. 4. This sensor array 106 comprises an array of transceivers 108, each of which is capable of sending and receiving signals. The transceivers 108 are angularly arrayed so that the entire forward field of view is included within the beams of the transceivers 108 taken collectively. In fact, by extending the array, a greater spherical viewing area is possible, extending to a 360° view if necessary. A multiplexer 110 individually addresses the transceivers either sequentially or randomly, so that a single set of signal generator and analysis logic, to be described subsequently, may be utilized.

All of the transmitters and the receivers described herein are adapted for use of the same general type and frequency of energy, preferably from about 20,000 to about 200,000 cycles per second. Although in theory, any frequency of energy may be utilized, in practicing the invention with the presently available electronic components, it is preferably to utilize energy transmitted in waves travelling at a relatively low velocity, such as acoustic radiation. In the most preferred embodiment, a narrow beam ultrasonic transducer may be utilized for both the transmitter and receiver functions for the forward facing precision positioning subsystem (i.e., the transmitter 56 and the receivers 58, 60, and 62). One acceptable and preferred transducer is the model E-188 transducer available from Massa Products Corporation, Hingham, Mass. This transducer may be driven by a signal generator 64, such as model MP215, available from Metrotech, Inc., Richland, Wash. to emit acoustic waves, or can operate as a receiver to receive acoustic waves. The most preferred transducer for use as the side facing transducers 102 and 104 in the approximate positioning subsystem is a broad beam transducer having a beam angle of about 25°. Two acceptable and preferred transducers are the models V189 and A189R, available from Panametrics, Waltham, Mass.

Figure 7:
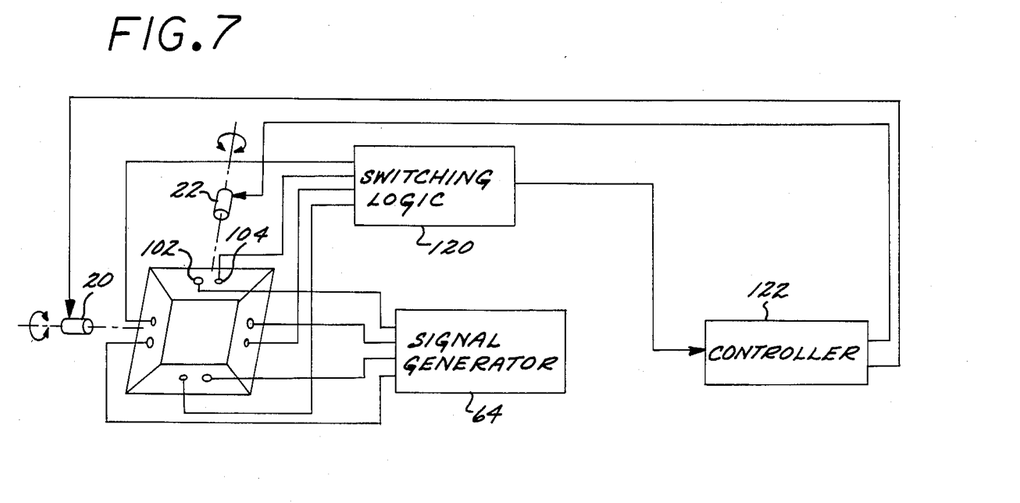
FIG. 7 is a block circuit diagram of the approximate positioning subsystem used in orienting a robot arm.

In the following description of the apparatus and its operation, the components of the approximate positioning subsystem and the precision positioning subsystem are presented separately to maintain clarity. The approximate positioning subsystem provides the orientation component to the drive motors 18, 20, and 22, to bring the sensor head 30 into an approximate facing relation to the surface 38. The approximate positioning subsystem includes the side facing transmitters 102 and receivers 104, and electronic processing components such as illustrated in FIG. 7. The precision positioning subsystem provides the positioning component to the drive motors 18, 20, and 22, to establish precise positioning once the approximate facing relationship has been reached. The precision positioning subsystem includes the forward facing transmitter 56 and receivers 58, 60 and 62, and electronic processing components such as illustrated in FIG. 8.

In a typical operation to be performed by a robot 14, it is known that a surface 38 will be presented to the robot 14 at some time, but the position and orientation of the surface 38 at the time of presentation are not known with certainty. In particular, it cannot be known whether the surface 38 will be presented so as to be within the field of view of the precision positioning subsystem transducers 56, 58, 60 and 62. The approximate positioning subsystem is therefore provided to sense the presence and general or approximate position of the presented surface 38, and to move the sensor head 30 into an approximate facing relationship with the surface 38, a "facing relationship" being an orientation of the sensor head 30 wherein the surface 38 is within the field of view of the transmitter 56 and the receivers 58, 60 and 62. FIG. 5 illustrates the operation of the transducers 102 and 104 in locating a surface 38 that is outside the field of view of the transducers 56, 58, 60 and 62 of the precision positioning subsystem.

Turning first to the approximate positioning subsystem illustrated in FIG. 7, the orientation of the surface 38 is sensed by determining the side direction from which a response signal is first received. This determination is achieved by using the four broad beam acoustic transmitters 102 mounted on the side lips 100 of the sensor head 30, which continuously transmit acoustic signals under excitation of the signal generator 64, in all directions within their collective spherical 135°-140° field of view. The broad beam acoustic receivers are mounted on the lips 100 in a pairwise fashion, with the receivers 104 used to sense the direction of a responsive signal, if any is found. As illustrated in FIG. 7, a switching logic 120 identifies which receiver is sensing the response signal, if any, thus determining the approximate orientation of the surface 38 in respect to the sensor head 30. The switching logic 120 then commands a controller 122 to send orientation control signals to motors 18, 20, or 22 to rotate the sensor head 30 in the direction toward which the responsive signal was received. The rotation of the sensor head 30 is continued by operating motors 20 or 22 until the signal from the receivers 104 disappears. In this position the sensor head 30, and the movable arm upon which it is mounted, is approximately in a facing relationship to the surface 38, and none of the four receivers 104 on the side lips 100 of the sensor head 30 receive any response signal. Operation of the precision positioning subsystem follows this initial step of bringing the sensor head 30 approximately to a facing relation to the surface 38.

Figure 8:
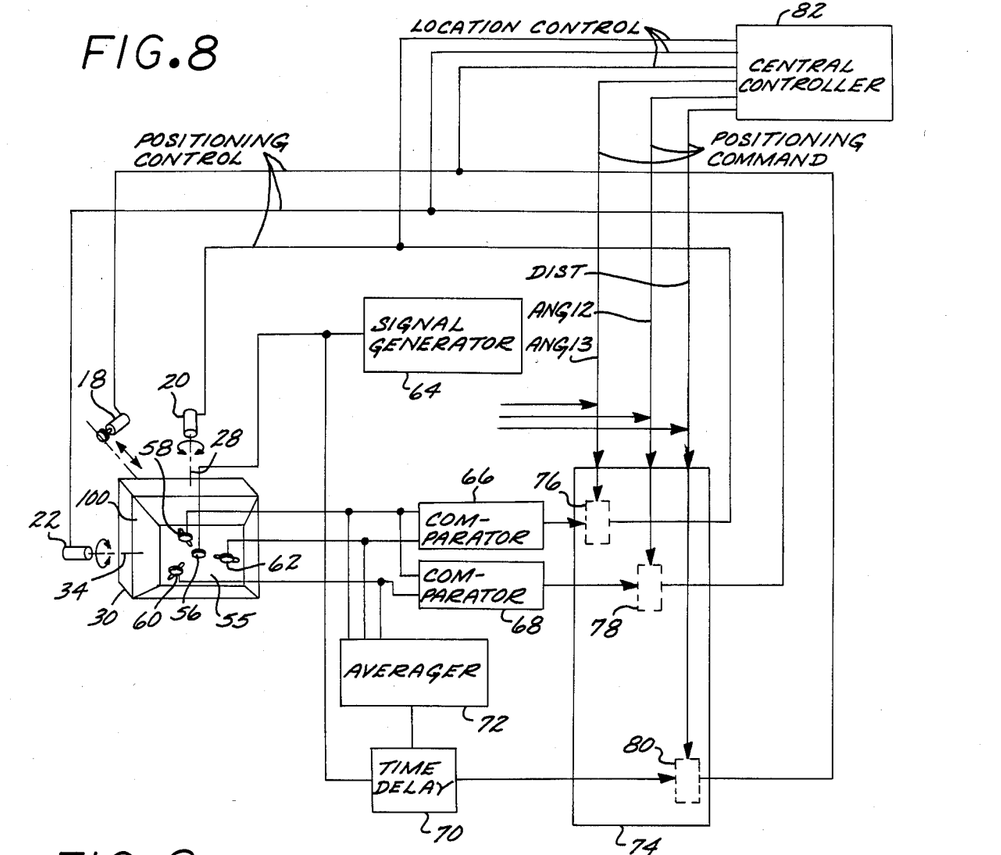
FIG. 8 is a circuit diagram of the precision positioning subsystem used in orienting a robot arm.

Referring to the precision positioning subsystem illustrated in FIG. 8, the output signals from the receivers 58, 60, and 62 are provided in pair-wise fashion to two comparators 66 and 68. The first comparator 66 determines the difference in the time of flight between the signals produced by the first receiver 58 and the third receiver 62, while the second comparator 68 determines the difference in the time of flight between the signals of the first receiver 58 and the second receiver 60. The output signal of the first comparator 66 is therefore an indication of the difference in the distance from the surface of the workpiece of the first receiver 58 and the third receiver 62, which in turn is an indication of the angular orientation of the axis defined by the first receiver 58 and the third receiver 62.

Figure 9:
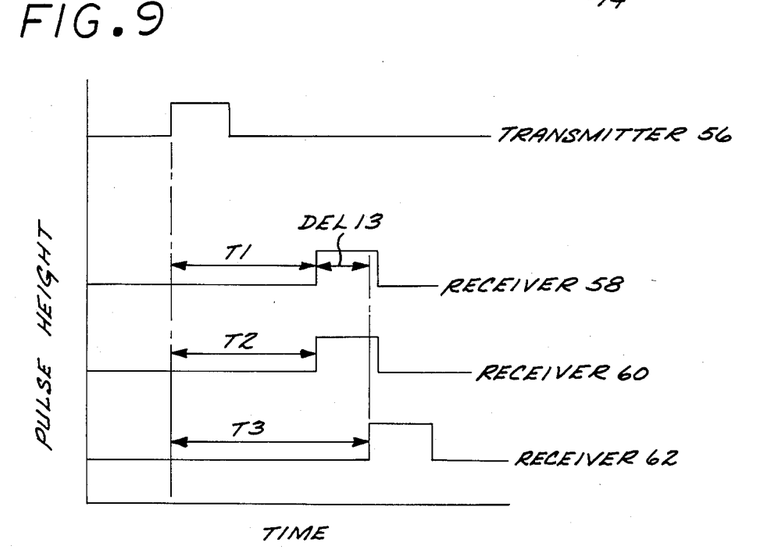
FIG. 9 is an exemplary schematic signal timing diagram for the precision positioning subsystem.

FIG. 9 presents an exemplary schematic illustration of the interrelationship of some acoustic pulses transmitted to a surface and received by the embodiment illustrated in FIG. 8. It is hypothesized, for the purposes of the illustration presented in FIG. 9, that the emitted signal is received back by the first receiver 58 and the second receiver 60 at the same time, while there is a delay in receipt of the return signal by the third receiver 62. The output signal of the first comparator 66 is proportional to the difference in the time of receipt by the first receiver 58 and the third receiver 62, a value indicated in FIG. 9 as DEL13. While DEL13 is a time value, the corresponding distance may be determined by multiplying this value by the velocity of the acoustic wave in the medium, about 1100 feet per second for acoustic waves in air. From the known length of the baseline between the first receiver 58 and the third receiver 62, and the difference in distance from the surface of the first receiver 58 and the third receiver 62, the angular orientation of the axis defined by the first receiver 58 and the third receiver 62 may be readily calculated. Of course, in most cases an actual calculation is not required, as the desired time difference values, if any, may be used directly to control the motors.

In a similar fashion, the signals from the first receiver 58 and the second receiver 60 are provided to the second comparator 68, wherein the difference in propagation time of the signal, the difference in distance between the surface and the two receivers 58 and 60, and the angular orientation of the axis defined by the first receiver 58 and the second receiver 60 may be determined in the fashion described above. In the illustration of FIG. 9, it has been postulated that the first receiver 58 and the second receiver 60 are at the same distance from the surface, and therefore there is no difference in the time of receipt of the signals. It is not necessary that a third comparator be provided, inasmuch as the orientation of the sensor head 30 in respect to the surface 38 may be defined fully by the angular displacement of two axes. However, if desired, a third comparator (not illustrated) may be provided as a check against the results determined by the comparators 66 and 68. In other embodiments, only two receivers and a single comparator could be provided if it were desired only to know the angular misorientation along a single axis, such as, for example, where the workpiece is highly elongated and essentially one-dimensional, and the robot has no freedom of movement perpendicular to the workpiece. More than three receivers, and more than two comparators, could also be provided for redundancy and to cross-check the determinations of the primary receivers, or for special applications, wherein the simultaneous orientation with respect to two or more surfaces is desired. Other applications of this approach of time-of-flight triangulation of acoustic signals are also operable, as where the transmitter 56 and receivers 58, 60 and 62 are replaced by three or more transceivers which both send and receive signals. Other non-colinear physical arrangements of the transmitters and receivers may be appropriate for specific applications.

The distance or spacing of the sensor head 30 from the surface 38 may be determined by computing the time of flight of the return signal from the surface 48 to the receivers 58, 60, and 62. If only an approximation is needed, the time of flight from the surface to any one of the receivers may be utilized. If a more precise figure is desired, the following preferred approach may be utilized.

As the signal generator 64 sends a signal to the transmitter 56, the signal is also transmitted to a time delay unit 70, as an indication of the time at which the emitted acoustic signal leaves the sensor head 30. When the return signal is received by the receivers 58, 60, and 62, this signal is provided to an averager 72, which provides an average time of receipt of the return signal to the time delay 70. If the plane containing the receivers 58, 60, and 62 is parallel to the surface, the average value will be identical to each of the individual values. However, if the plane is not parallel to the surface, then the return signals are received at different times. In the hypothetical example of FIG. 9, the first receiver 58 and the second receiver 60 are at the same distance from the surface, and their respective times of flight T1 and T2 are identical. The third receiver 62 is at a greater distance, and the time of flight of the acoustic signal is greater. The averaging unit 72 approximates the distance of the center of the triangle defined by the three receivers 58, 60, and 62 from the surface.

The time delay 70 calculates the difference between the average time of receipt of the return signal and the emission time of the acoustic emitted signal. The distance of the sensor head 30 from the surface 48 is then calculated as one-half of the product of the time of flight multiplied by the velocity of wave propagation in the medium. Where transceivers are used both to send and receive the acoustic signals, this ranging logic must be altered slightly. In this case, the averager 72 is placed logically after the time delay 70, to determine an average time of flight for the three signals, this being a measure of the distance of the center of the sensor head 30 to the surface 38.

The output signals from the comparators 66 and 68, and the time delay 70, provide information as to the actual positioning of the sensor head 30 in relation to the surface 38. It is next necessary to compare these actual signals with the desired signals, illustrated as the "Positioning Commands" in FIGS. 3 and 8. Three positioning commands are required, the angular orientation of the axis defined by the first receiver 58 and the third receiver 62, herein termed ANG13, the angular orientation of the axis defined by the first receiver 58 and the second receiver 60, herein termed ANG12, and the average distance of the sensor head 30 from the surface 48, herein termed DIST. These signals are input to a controller 74, which also receives the output signals from the first comparator 66, the second comparator 68, and the time delay unit 70.

The controller 74 comprises three control comparators. A C13 control comparator 76 compares the signal received from the first comparator 66 with the ANG13 positioning command, with the output of the C13 control comparator 76 being a positioning control signal provided to the first rotational motor 20, which rotates the sensor head 30 about the axis 28. Preferably, as illustrated in FIG. 3, the location control signal may be superimposed upon the positioning control signal and the orientation control signal to provide the total command signal to the first rotational motor 20. Similarly, the C12 control comparator 78 compares the signal received from the second comparator 68 with the ANG12 positioning command, and provides a positioning control signal to the second rotational motor 22. A DIST control comparator 80 compares the signal received from the time delay unit 70 with the DIST positioning command, and sends a positioning control signal to the vertical movement motor 18, thereby controlling the spacing or distance of the sensor head 30 from the workpiece surface 38. Location and orientation control signals are also superimposed on the signals from the C12 control comparator 78 and the DIST control comparator 80. The logic of the comparators compensates for simple geometrical effects such as angular misorientations between the rotational axis and the receiver axis.

The switching logic 120 used in controlling the orientation of the robot arm 12 to approximately parallel to the surface 38 is a conventionally used logic module, for example Model No. 54/7400 or 54LS/74LS00 made by Fairchild Corp., Mountain View, Calif. The comparators 76, 78 and 80 are conventional, such as Model No. LM139, LM239, LM2901, and LM3302 all of which are made by National Semiconductor Corp. The averager 72 is a Model No. DM502 and the time delay 70 is a Model No. DD501, both made by Tektronix, Inc. Beaverton, Oreg. The controllers 48, 52, and 74 are standard analog voltage regulators consisting of a pulse generator, amplifiers, filters and comparators. The associated electronics incorporates conventionally used circuitry for simplicity and ease of operation; these include amplifier Model Nos. 7B10 or 7B15, function generator Model No. PR505, a digital latch Model No. DL502, signal recognizer Model No. WR501, time mark generator Model No. TG501 and digital counters Model No. DC501, all made by Tektronix, Inc.

The preferred apparatus 10, has the important advantages of the present invention. The electronic hardware components are reliable, commercially available electronic hardware components which do not require any programming or software. All of the electronic components may be placed on a single circuit board. It is therefore possible, and in fact preferable, to locate the orientation and positioning control logic remotely from the main programming controller of the robot 14, as within the sensor head 30 or the movable arm 12. Output of the controller 74 is directly connected to the motors 18, 20, and 22, and does not require any interface to the central controller 82. The presence of such an interface would slow operation of the apparatus 10 significantly. In a sense, the apparatus 10 acts in a manner comparable with that of the human reflex system, wherein it is not required that control signals for reflexive actions pass through the central brain, but such reflexive actions may be superimposed on volational commands to control the muscles. In the present apparatus 10, the orientation and positioning control signals are remotely generated, apart from the location control signals. Updating of the positioning control signal is therefore not dependent upon the cycle time and software structure of the central robot controller 82, and the interface thereto, and therefore can proceed much more rapidly than could prior devices. The rate of updating the positioning control signals is instead determined by the pulse frequency of the signal generator 64 and by the frequency response of the sensors, which is about 20,000 to 200,000 cycles per second.

In a typical robot function, the location control signals are generated by the central controller 82, to move the movable arm 12 to a new coordinate location relative to the workpiece surface 38. At the new location, it may be desired to maintain the sensor head 30 at the same relative angular and spacing positions with respect to the workpiece surface 38, and in this circumstance the positioning commands ANG13, ANG12, and DIST are unchanged. As the movable arm 12 moves to its new commanded coordinate location, the sensor head 30 is automatically repositioned with respect to the surface 38 to maintain the same relative angular and spacing position with respect to the new coordinate location on the surface 38.

If the shape of the surface 38 is regular and varies slowly, the precision positioning subsystem is sufficient to follow the surface and maintain the precise relative position of the sensor head 38. In this instance no orientation control signal is generated by the approximate positioning subsystem. On the other hand, if the surface 38 is irregular and rapidly varying, the approximate positioning subsystem may come into play. The latter is not ordinarily the case, since the short adjustment time of the precision positioning system allows it to follow the surface directly. The approximate positioning subsystem ordinarily comes into operation only when a new surface is presented and the apparatus 10 must locate the surface and establish an approximate facing relation.

The positioning commands may be simply changed by the central controller 82 as the movable arm 12 traverses the surface 38. Significantly, the central controller 82 need not incorporate complex pattern recognition functions as required by prior devices, but instead is concerned only with outputting three location control signals and three positioning commands, and in many cases the three positioning commands remain unchanged. For example, if a workpiece is to be spray painted, the position (i.e., angular relation and distance) of the sensor head 30 (and paint gun, not shown) remain the same, and it is only necessary that the paint gun traverse over the entire surface in this position. It is also possible to automatically map an unknown surface profile with the present apparatus, simply by traversing the movable arm 12 in a controlled fashion, with the positioning control signals set to some constant value, and then automatically recording the positionings of the motors 18, 20, and 22.

It will now be appreciated that the present invention presents a signficant advance in the field of robot systems, and particularly in the field of the control of intelligent robots. The present invention allows remote positioning of the movable part of the robot, without prior knowledge or mapping of the surface, thereby significantly simplifying the control functions required of the central robot controller. The robot need not be dedicated to use with a specific part in the sense that a complex pattern recognition program must be written for each new application, but instead it is necessary only to develop traversing command programs to accomodate any of a variety of workpieces. As an example, if the robot is to sandblast a number of different metal castings, it is necessary only to input a command program which ensures that the movable arm traverses over the entire surface of a casting presented for sandblasting. It is not necessary to specify the geometry of the workpiece, as the traversing program can record and recognize when the movable arm has previously traversed the region, and can keep track of the areas traversed until the entire surface has been traversed. During this traversing operation, the present apparatus will maintain the correct positioning of the sandblasting gun at a desired angular inclination and distance for all traversed positions. The acoustic approach of the present apparatus allows the control function to continue, even though visual images might be blurred by the sandblasting process. These principles are equally applicable to many other robot applications, and the scope of the present invention is not to be limited by specific applications discussed herein. Thus, although a particular embodiment of the invention has been described in detail for purposes of illustration, various modifications may be made without departing from the spirit and scope of the invention. Accordingly, the invention is not to be limited except as by the appended claims.

What is claimed is:

1. Apparatus for positioning a movable portion of a robot device with respect to a surface, comprising:
   an approximate positioning subsystem, including,
   means for emitting at least two non-colinear approximate positioning signals,
   means for receiving a response signal, if any, resulting from the striking of the approximate positioning signals on the surface, said means for receiving being mounted on the movable portion of the robot device,
   means for detecting the presence of a first received response signal,
   means for adjusting the movable portion of the robot device into an approximate facing relationship to the detected first received response signal; and
   a precision positioning subsystem operable when the movable portion is in an approximate facing relationship to the surface, including,
   means for emitting a precise positioning signal toward the surface;
   means for receiving a return signal originating at the surface as a result of the precise positioning signal striking the surface, said means for receiving being mounted on the movable portion of the robot device and including at least two signal receivers,
   means for comparing the times of flight of the return signals received by said signal receivers on a pair-wise basis to create a comparison signal, and
   means for adjusting the movable portion of the robot device to maintain predetermined values of the comparison signal.

* * * * *